US007853977B2

(12) United States Patent
Sakamoto

(10) Patent No.: US 7,853,977 B2
(45) Date of Patent: Dec. 14, 2010

(54) DEVICE AND METHOD FOR DISPLAYING IMAGES ACCORDING TO WIRELESS RECEPTION DEGREE

(75) Inventor: Kenji Sakamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 514 days.

(21) Appl. No.: 10/553,346

(22) PCT Filed: Apr. 14, 2004

(86) PCT No.: PCT/JP2004/005337

§ 371 (c)(1),
(2), (4) Date: Oct. 14, 2005

(87) PCT Pub. No.: WO2004/093435

PCT Pub. Date: Oct. 28, 2004

(65) Prior Publication Data

US 2007/0044025 A1    Feb. 22, 2007

(30) Foreign Application Priority Data

Apr. 17, 2003  (JP) ............................. 2003-112680
Apr.  9, 2004  (JP) ............................. 2004-116184

(51) Int. Cl.
G06F 3/00   (2006.01)
G06F 13/00  (2006.01)
H04N 5/445  (2006.01)
H04N 7/18   (2006.01)

(52) U.S. Cl. ......................................... 725/59; 725/78

(58) Field of Classification Search .................... 725/49, 725/59; 715/853, 969, 734–739; 455/457
See application file for complete search history.

(56) References Cited

U.S. PATENT DOCUMENTS 5,155,590 A    10/1992   Beyers, II et al.

(Continued)

FOREIGN PATENT DOCUMENTS

GB          2 329 801 A      3/1999

(Continued)

Primary Examiner—Scott Beliveau
Assistant Examiner—Bennett Ingvoldstad
(74) Attorney, Agent, or Firm—Birch, Stewart, Kolasch & Birch, LLP

(57) ABSTRACT

A display device including a communication function for performing wireless communication of data with each of a plurality of devices, and a display function for displaying and outputting information. First, reception quality of each device is obtained (S 100). Next, based on the reception quality of each device, average reception quality of each room in which each device is placed is obtained (S 101). Next, based on the average reception quality of each room, the size of an image indicating each room is obtained (S 102), and based on the obtained size, the image indicating each room is illustrated on a display screen (S 103). Next, based on the reception quality of each device, the size of an image indicating each device with respect to each room is obtained (S 104), and based on the obtained size, the image indicating each device is illustrated on the display screen (S103).

24 Claims, 9 Drawing Sheets

U.S. PATENT DOCUMENTS

| | | |
|---|---|---|
| 5,802,469 A | 9/1998 | Nounin et al. |
| 5,831,618 A * | 11/1998 | Fuji et al. .................... 715/853 |
| 5,883,621 A * | 3/1999 | Iwamura ...................... 725/37 |
| 5,926,765 A | 7/1999 | Sasaki |
| 5,966,186 A | 10/1999 | Shigihara et al. |
| 6,363,245 B1 | 3/2002 | Natori |
| 6,987,847 B1 * | 1/2006 | Murphy et al. ........... 379/201.1 |
| 2002/0018057 A1 * | 2/2002 | Sano ......................... 345/204 |
| 2002/0044533 A1 | 4/2002 | Bahl et al. |
| 2002/0110088 A1 | 8/2002 | Lundby et al. |
| 2003/0063589 A1 * | 4/2003 | Haines et al. ............... 370/338 |
| 2003/0065803 A1 | 4/2003 | Heuvelman |
| 2003/0080992 A1 * | 5/2003 | Haines ....................... 345/734 |
| 2003/0120742 A1 | 6/2003 | Ohgami et al. |
| 2004/0203435 A1 * | 10/2004 | Karlquist et al. ......... 455/67.11 |

FOREIGN PATENT DOCUMENTS

| | | |
|---|---|---|
| GB | 2 343 334 A | 5/2000 |
| JP | 7-336778 A | 12/1995 |
| JP | 9-149325 A | 6/1997 |
| JP | 9-215042 A | 8/1997 |
| JP | 2001-337763 A | 12/2001 |
| JP | 2002-135745 A | 5/2002 |
| JP | 2002-281468 A | 9/2002 |
| JP | 2002-288073 A | 10/2002 |
| JP | 2002-291039 A | 10/2002 |
| JP | 2002-314649 A | 10/2002 |
| JP | 2003-92616 A | 3/2003 |
| JP | 2003-110580 A | 4/2003 |

* cited by examiner

FIG. 8

|  | DETERMINATION OF DISTANCE BY RECEIVER | DETERMINATION OF DISTANCE BY TRANSMITTER A-2 | DETERMINATION OF DISTANCE BY TRANSMITTER C-1 |
|---|---|---|---|
| RECEIVER | — | NEAR | MIDDLE |
| A−1, A−2 | NEAR | — | FAR |
| B−1, B−2 | FAR | MIDDLE | MIDDLE |
| C−1, C−2 | MIDDLE | FAR | — |

DEVICE AND METHOD FOR DISPLAYING IMAGES ACCORDING TO WIRELESS RECEPTION DEGREE

TECHNICAL FIELD

The present invention relates to: a display device having a function of receiving data transmitted wirelessly from one or more transmission devices; a wireless communication system including the one or more transmission devices and the display device; methods and programs for controlling the display device and the wireless communication system; and storage media readable by a computer, for storing the programs.

BACKGROUND ART

Recently, with the explosive prevalence of the Internet, a LAN (Local Area Network) is frequently constructed in offices, houses and the like. Further, because cable wiring is troublesome, there is an increasing need for so called wireless LANs which construct a LAN wirelessly, which is aided by progress in digital wireless communication technologies. Wireless LANs are expected to be used in large numbers, because the devices can be used in mobile terminals such as notebook computers in mobile environments.

As a representative technology of the wireless LAN, there is IEEE 802.11 which has already been standardized in IEEE (Institute of Electrical and Electronics Engineers). This standardized technology defines from a physical layer to a MAC (Media Access Control) layer, being a lower layer of a data link in an OSI model, and can be replaced with Ethernet™ which is a wired LAN transmission channel. Further, IEEE 802.11 can provide a roaming function as an additional function due to being wireless.

There is an AV control system, using a GUI (Graphical User Interface), in which a plurality of AV (Audio Visual) devices are radially connected with a television (referred to as "TV" hereinafter) receiver capable of graphic display, information regarding each AV device is displayed on a display screen of the TV receiver using icons or the like and by operation of a remote controller; selection and operation of the icons or the like allows dedicated operation of each AV device. The AV device is explained below using a video tape recorder (referred to as a VTR hereinafter) as an example.

In such an AV control system, when a VTR is operated, two selection operations are necessary: one is an operation for selecting the VTR to be operated from a plurality of VTRs; and the other is an operation performed on the selected VTR, for selecting a desired execution function from a plurality of execution functions such as recording, reproducing, stopping, and rewinding.

The TV receiver stores graphic display data regarding each VTR in a table form. In response to an operation request to a desired VTR from a remote controller operated by a user, the TV receiver displays on a display screen an operation window corresponding to the VCR in a position having a one-to-one relation with the VTRs, and displays a plurality of function buttons in the operation window which indicate a variety of functions. When the user selects with a cursor one of the displayed function buttons, the TV receiver instructs the VTR to carry out the selected function.

The operation window is superposed on a usual screen image. When a plurality of operation windows are to be displayed, the process is repeatedly carried out a number of times corresponding to the number of the operation windows.

FIG. 10 is a block diagram illustrating one example of the AV control system. As illustrated in FIG. 10, an AV control system 200 has a structure in which four VTRs 202 through 205 are radially connected with a TV receiver 201. In the AV control system 200, for example, when the user causes a VTR (A) 202 to perform a reproducing operation, the following operation is performed using the GUI.

(1) First, the control section of the TV receiver 201 checks whether a plurality of control cables 206 through 209, connected to the TV receiver 201, are connected to VTRs 202 through 205 respectively, finds out the machine-types of the connected VTRs 202 through 205, and registers the machine-types in a machine-type table.

(2) Next, when the user uses a remote controller 210 and specifies a menu display on the TV receiver 201, four icons corresponding to VTR (A) 202 through VTR (D) 205 are displayed on four points of a display screen such as a CRT, and a cursor is also displayed.

(3) Next, when the user uses the remote controller 210 and specifies with the cursor an icon corresponding to the VTR (A) 202, an operation window corresponding to the VTR (A) 202 is displayed on the position of the icon. In the operation window, a recording button, a reproducing button, a stopping button, a rewinding button and the like are displayed.

(4) At that time, for example, when the reproducing button in the operation window of the VTR (A) is depressed, a command for beginning a reproducing operation is transmitted to the VTR (A) 202 from the TV receiver, and at the same time a command for instructing the TV receiver to switch to a video input from the VTR (A) 202 is sent. As a result, the reproducing operation of the VTR (A) 202 is started, and at the same time an output of the VTR (A) 202 is inputted to the TV receiver, and accordingly an image reproduced by the VTR (A) 202 is displayed on the display screen.

In the above conventional example, graphic display data is included in the TV receiver. On the other hand, as disclosed in Patent Document 1, there is a system in which graphic display data is dispersedly stored by each of a plurality of AV devices, and thereby the TV receiver performs graphic display of only a response to a request, which allows display of a new AV device. Further, as disclosed in Patent Document 2, there is a system which allows display of error data from the AV device side, when a failure occurs in the AV device. Further, Patent Document 3 discloses an apparatus which causes a structure display of a network system to include display of functions of individual devices, so as to simplify operations of the devices.

Here, Patent Document 1 is Japanese Laid-Open Patent Publication 149325/1997 (Tokukaihei 9-149325) (published on Jun. 6, 1997), and particularly FIG. 1 of the publication.

Further, Patent Document 2 is Japanese Laid-Open Patent Publication 336778/1995 (Tokukaihei 7-336778) (published on Dec. 22, 1995), and particularly FIG. 1 of the publication.

Further, Patent Document 3 is Japanese Laid-Open Patent Publication 337763/2001 (Tokukai 2001-337763) (published on Dec. 7, 2001), and particularly FIG. 1 of the publication.

However, the conventional AV control systems as described above have a problem that it is difficult to know whether a nearby AV device is operated, or a distant AV device connected to a network is operated. Particularly, when an AV device exists in a distant room or when a lot of AV devices exist, it is difficult to find out a desired device on a display on a console.

The present invention is made in view of the foregoing problems, and its object is to provide a display device, a wireless communication system and the like which make it easy to know an estimated positional relationship among AV devices and the like, connected so as to perform wireless communication.

DISCLOSURE OF INVENTION

In order to achieve the object, the display device according to the present invention includes: reception means for receiving data transmitted wirelessly from a plurality of transmission devices; display means for displaying and outputting information; and control means for controlling a function of the display device, wherein the control means includes: reception state detection means for detecting a state of reception of the reception means; and display control means for controlling the display means so that the display means displays images respectively indicating the transmission devices, based on the state of reception detected by the reception state detection means.

Here, the state of reception can be detected, based on one of electric field strength of a received radio wave and an error ratio of received data, or a combination of these.

With this structure, the reception state detection means detects the state of reception of the reception means, and the display control means controls the display means so that the display means displays images respectively indicating transmission devices, based on the detected state of reception. Although a state of reception depends on obstacles between a transmission device and a display device, the state of reception basically depends on a distance between the transmission device and the display device. Therefore, by displaying an image of each of the transmission devices based on the state of reception, a user can easily comprehend an estimated distance between the display device and each of the transmission devices. As a result, the user can easily find a desired transmission device.

In order to achieve the object, the display device according to the present invention includes: communication means for performing wireless communication of data with each of a plurality of communication devices; display means for displaying and outputting information; and control means for controlling a function of the display device, wherein the control means includes: communication state detection means for detecting a state of communication of the communication means; and display control means for controlling the display means so that the display means displays images respectively indicating the communication devices, based on the state of communication detected by the communication state detection means.

Here, the state of communication can be obtained, based on at least one of electric field strength of a received radio wave, an error ratio of received data, and a frequency of a request for re-transmission of data based on the error ratio.

With this structure, the communication state detection means detects the state of communication of the communication means, and the display control means controls the display means so that the display means displays the images respectively indicating the communication devices, based on the detected state of communication. Although a state of communication depends on obstacles between a communication device and a display device, the state of communication basically depends on a distance between the communication device and the display device. Therefore, by displaying an image of each of the communication devices based on the state of communication, a user can easily comprehend an estimated distance between the display device and each of the communication devices. As a result, the user can easily find a desired communication device.

Note that it is preferable that the display control means determines a distance from the display device, based on the state of communication detected by the communication state detection means, and displays the images respectively indicating the communication devices, based on the determined distance. In this case, because the image of each of the communication devices is displayed according to perspective, the user can more easily comprehend an estimated distance between the display device and each of the communication devices. As a result, the user can more easily find a desired communication device.

Here, in order to display an image according to perspective, it is conceivable that, for example, an image indicating a communication device near the display device is displayed in a large size, and an image indicating a communication device far from the display device is displayed in a small size. Alternatively, it is conceivable to express a depth by 3-D display.

Further, it is preferable that the communication state detection means detects a state of communication with communication device(s) with which a communication link is established, out of the plurality of communication devices. In this case, because the user can comprehend a state of reception with a communication device with which the user wants to communicate, the user can move the display device so as to improve the state of reception.

Further, it is preferable that the display control means displays the images for respectively indicating the communication devices in a form according to the state of communication detected by the communication state detection means.

Here, the form is, for example, the shape, size, or color of the image. Further, the form according to the state of communication is, for example, such that, when the state of communication is in a good condition, the outline of the image is sharpened, the size of the image is enlarged, or the color of the image is deepened. On the other hand, when the state of communication is in a bad condition, the outline of the image is gradated, the size of the image is reduced, or the color of the image is made faint. Therefore, with the structure, the user can sensibly comprehend an estimated distance between the display device and each of the transmission devices, with a result that the user can promptly find a desired transmission device.

Further, it is desirable that the display device of the present invention further includes storage means for storing information regarding rooms in which the communication devices are placed, and the display control means performs display control, so as to display an image for indicating each of the rooms, based on a state of communication of communication device(s) placed in each of the rooms, out of the state of communication detected by the communication state detection means. In this case, even though there are a plurality of communication devices whose distance to the display device are similar, rooms in which the communication devices exist are different. As such, the locations of the communication devices can be easily discriminated.

In order to achieve the object, the wireless communication system according to the present invention is a wireless communication system made by connecting one or more communication devices with a display device so that the one or more communication devices and the display device can communicate with each other wirelessly, wherein (i) the one or more communication devices include communication means for performing wireless communication of data with the display device, and control means for controlling a function of the one or more communication devices, (ii) the display device includes communication means for performing wireless communication of data with the one or more communication devices, display means for displaying and outputting information, and control means for controlling a function of the display device, (iii) the control means of the one or more communication devices includes communication state detection means for detecting a state of communication of the communication means, and communication state transmission means for transmitting, via the communication means, the state of communication detected by the communication state detection means to the display device, and (iv) the control means of the display device includes communication state acquisition means for acquiring, via the communication means, the state of communication detected by the communication state detection means of the one or more communication devices, and display control means for controlling the display means so that the display means displays an image or images indicating the one or more communication devices, based on the state of communication acquired by the communication state acquisition means.

Here, the state of communication can be detected, based on at least one of electric field strength of a received radio wave, an error ratio of received data, and frequency of a request for re-transmission of data based on the error ratio.

With this structure, the communication state detection means detects the state of communication of the communication means, and the display control means controls the display means so that the display means displays an image indicating each of the communication devices, based on the detected state of communication. Although a state of communication depends on obstacles between a communication device and a display device, the state of communication basically depends on a distance between the communication device and the display device. Therefore, by displaying an image of each of the communication devices based on the state of communication, the user can easily comprehend an estimated distance between the display device and each of the communication devices. As a result, the user can easily find a desired communication device.

Further, because the communication device detects the state of communication, it is unnecessary for the display device to include communication state detection means. As a result, it is possible to downsize the display device and to reduce consumption of electricity of the display device. This is preferable when the display device is used for portable terminal devices such as portable phones and PDAs.

It is preferable that the display control means of the display device determines a distance from the display device, based on the state of communication acquired by the communication state acquisition means, and controls the display means so that the display means displays the image or images respectively indicating the one or more communication devices, based on the determined distance. In this case, by displaying an image of each of the communication devices according to perspective, the user can more easily comprehend an estimated distance between the display device and each of the communication devices. As a result, the user can more easily find a desired communication device.

Here, in order to display an image according to perspective, it is conceivable that, for example, an image indicating a communication device near the display device is displayed in a large size, and an image indicating a communication device far from the display device is displayed in a small size. Alternatively, it is conceivable to express a depth by using a 3-D display.

Further, it is preferable that the communication state acquisition means of the display device acquires a state of communication with communication device(s) with which a communication link is established, out of the one or more communication devices. In this case, because the user can comprehend the state of reception with a communication device with which the user wants to communicate, the user can move the display device so as to improve the state of reception.

Further, it is preferable that the display control means of the display device controls the display means so that the display means displays the image or images for respectively indicating the one or more communication devices in a form according to the state of communication acquired by the communication state acquisition means. In this case, as described above, because the user can sensibly comprehend an estimated distance between the display device and each of the transmission devices, the user can promptly find a desired transmission device.

Further, it is preferable that the display device further includes storage means for storing information regarding rooms in which the one or more communication devices are placed, and the display control means of the display device performs display control, so as to display an image for indicating each of the rooms, based on a state of communication of communication device(s) placed in each of the rooms, out of the state of communication acquired by the communication state acquisition means. In this case, even though there are a plurality of communication devices whose distance to the display device are similar, rooms in which the communication devices exist are different. As such, the locations of the communication devices can be easily discriminated.

In the above structure, in the wireless communication system according to the present invention, there are a plurality of the communication devices, the communication means of each of the communication devices performs wireless communication of data with other communication device(s) as well as with the display device, the communication state detection means of each of the communication devices detects a state of communication with other communication device(s) as well as with the display device, the display control means of the display device controls the display means so that the display means displays the images respectively indicating the communication devices, based on the state of communication of the communication devices acquired by the communication state acquisition means.

A positional relationship on a line (one-dimension) such as an estimated distance between a display device and each of communication devices can be easily comprehended according to a state of communication. However, a positional relationship on a plane (two-dimensions) in which directions from the display device to each of the communication devices are added is difficult to comprehend, unless an electromagnetic wave having directivity is transmitted/received.

On the other hand, with the structure, each of the communication devices detects the state of communication with the display device and other communication device(s), and an image indicating each of the communication device(s) is displayed, based on the detected state of communication. In this case, because a communication device can comprehend an estimated distance to the display device and other communication device(s), the positional relationship on a plane between the display device and each of the communication devices can be comprehended easily.

Note that in the structure, the communication device detects a state of communication between the communication device and the display device. However, the display device can detect the state, by further including communication state detection means for detecting a state of communication with each of the communication devices.

In order to achieve the object, the method according to the present invention is a method of controlling a display device including: reception means for receiving data transmitted wirelessly from a plurality of transmission devices; and display means for displaying and outputting information, wherein said display device detects a state of reception of the reception means, and displays images respectively indicating the transmission devices, based on the detected state of reception.

With the method, the state of reception of the reception means is detected, and the image indicating each of the transmission devices is displayed, based on the detected state of reception. Although a state of reception depends on obstacles between a transmission device and a display device, the state of reception basically depends on a distance between the transmission device and the display device. Therefore, by displaying an image of each of the transmission devices based on the state of reception, a user can easily comprehend an estimated distance between the display device and each of the transmission devices. As a result, the user can easily find a desired transmission device.

In order to achieve the object, the method according to the present invention is a method of controlling a display device including: communication means for performing wireless communication of data with each of a plurality of communication devices; and display means for displaying and outputting information, wherein the display device detects a state of communication of the communication means, and displays images respectively indicating the communication devices, based on the detected state of communication.

With the method, the state of communication of the communication means is detected, and the image indicating each of the communication devices is displayed, based on the detected state of communication. Although a state of communication depends on obstacles between a communication device and a display device, the state of communication basically depends on a distance between the communication device and the display device. Therefore, by displaying an image of each of the communication devices based on the state of communication, a user can easily comprehend an estimated distance between the display device and each of the communication devices. As a result, the user can easily find a desired communication device.

The method according to the present invention of controlling a wireless communication system is a control method of a wireless communication system, made by connecting one or more communication devices with a display device so that the one or more communication devices and the display device can communicate with each other wirelessly, wherein: the one or more communication devices include communication means for performing wireless communication of data with the display device, the display device includes communication means for performing wireless communication of data with the one or more communication devices, and display means for displaying and outputting information, the wireless communication system detects a state of communication of communication means of the one or more communication devices, transmits the detected state of communication from the one or more communication devices to the display device, and displays an image or images indicating the one or more communication devices on the display means of the display device, based on the transmitted state of communication.

With the method, the state of communication of the communication means is detected, and the image indicating each of the communication devices is displayed, based on the detected state of communication. Although a state of communication depends on obstacles between a communication device and a display device, the state of communication basically depends on a distance between the communication device and the display device. Therefore, by displaying an image of each of the communication devices based on the state of communication, the user can easily comprehend an estimated distance between the display device and each of the communication devices. As a result, the user can easily find a desired communication device. Further, because the communication device detects the state of communication, it is unnecessary for the display device to detect the state of communication. As a result, it is possible to downsize the display device and to reduce consumption of electricity of the display device.

The control means of the display device can be carried out on a computer by a display device control program. Further, the control means of the wireless communication system can be carried out on a computer by a wireless communication system control program. Further, by storing the display device control program and/or the wireless communication system control program in a storage medium readable by a computer, it is possible to carry out the display device control program and/or the wireless communication system control program on an arbitrary computer.

As described above, in the display device according to the present invention, the communication state detection means detects the state of communication of the communication means, and the display control means controls the display means so that the display means displays the image indicating each of the communication devices, based on the detected state of communication. As a result, the user can easily comprehend an estimated distance between the display device and each of the communication devices, and accordingly can easily find a desired communication device.

For a fuller understanding of the nature and advantages of the invention, reference should be made to the ensuing detailed description taken in conjunction with the accompanying drawings.

BRIEF DESCRIPTION OF DRAWINGS

FIG. 8 is a figure illustrating in a tabular form a detection result in which the receiver and two of the transmitters illustrated in FIG. 4 detect states of communication with each of the receiver and other transmitters.

BEST MODE FOR CARRYING OUT THE INVENTION

Preferable embodiments of the present invention are described below with reference to the attached drawings.

Figure 1:
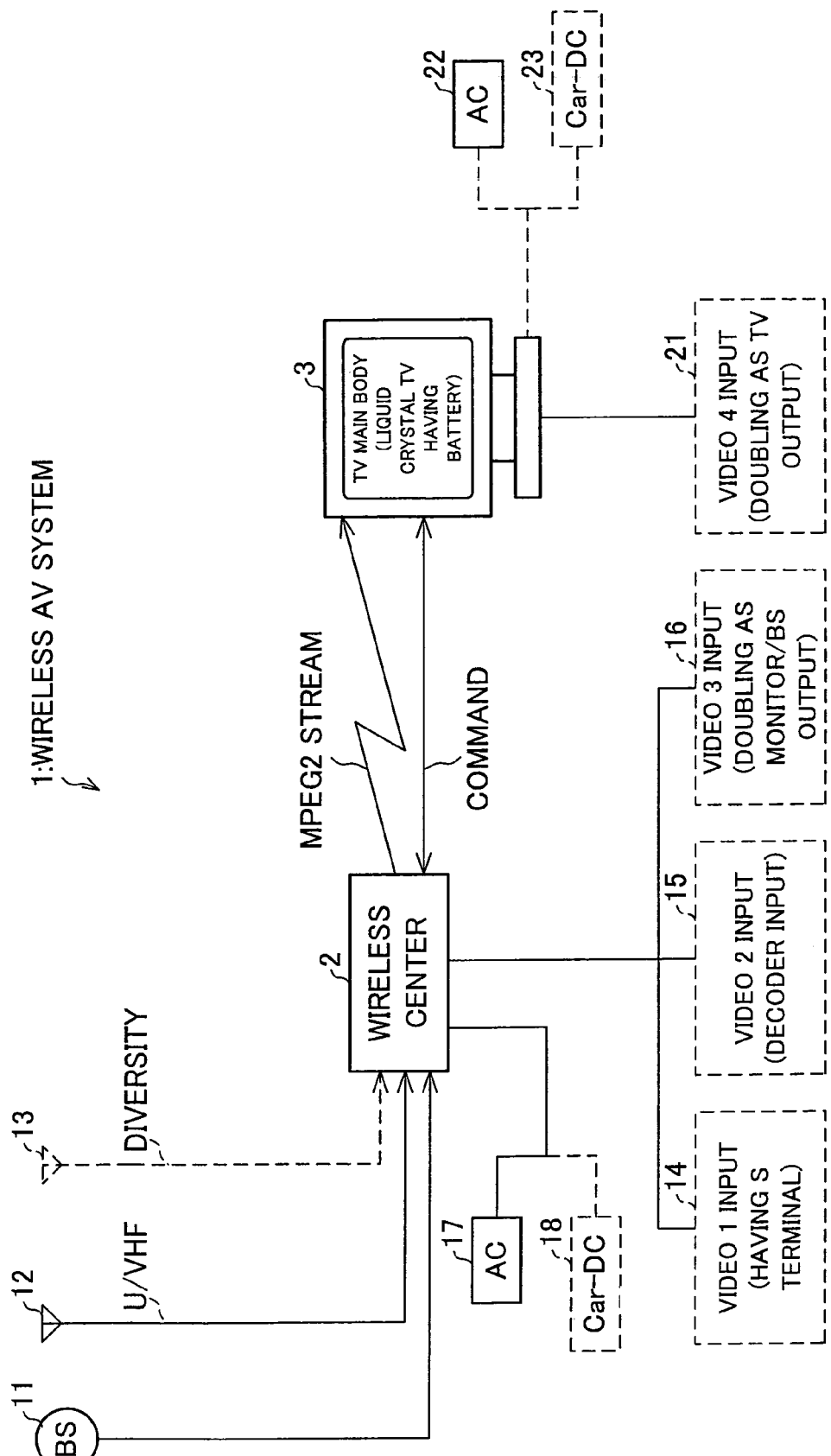
FIG. 1 is a block diagram illustrating a structure of a wireless AV system according to an embodiment of the present invention.

FIG. 1 is a block diagram illustrating a structure of the wireless AV system 1 according to an embodiment of the present invention. As the wireless AV system 1 according to the present embodiment, the invention is applied to a wireless TV receiver with a separable display. Further, FIG. 11 is an explanatory figure illustrating an outline of the wireless AV system 1 which is a wireless TV receiver with a separable display.

As illustrated in FIGS. 1 and 11, the wireless AV system 1 (wireless communication system) comprises a wireless center unit (referred to as a wireless center hereinafter) 2 provided as a base device, and a television (TV) main body unit (referred to as a TV main body hereinafter) 3 provided as a portable terminal (wireless terminal). A pair of the wireless center 2 (a communication device, a center device) and the TV main body 3 (a communication device, a display device, or a terminal device) constitutes a wireless transmission network.

As illustrated in FIG. 11, the TV main body 3 is wireless and includes a battery. Further, the TV main body 3 has a remote control, which allows remote control of a video deck or the like. Further, the wireless center 2 is connected with antennas for BS, U/VHF and the like, or with AV devices such as a DVD player and a video deck. Image and/or audio data is wirelessly transmitted to the TV main body 3 from the wireless center 2. Further, between the wireless center 2 and the TV main body 3, commands are wirelessly transmitted in either direction.

As illustrated in FIG. 1, the wireless center 2 includes antenna terminals (a BS terminal 11, a U/VHF antenna terminal 12, and a diversity terminal 13), a video 1 input terminal (having an S terminal) 14 for connecting a device such as a digital VTR or DVD player, a video 2 input terminal (decoder input) 15, a video 3 input terminal (doubling as a monitor/BS output) 16, and a power supplying terminal to which power is supplied from an AC power source 17 or a Car-DC power source 18.

The TV main body 3 includes a video 4 input terminal (doubling as a TV output) 21 for connecting a device such as a digital VTR or DVD (Digital Versatile Disc) player, and a power source input terminal to which power is supplied from an AC power source 22 or a Car-DC power source 23.

The TV main body 3 is a thin display device that is detachable from the wireless center 2 and is mobile or portable because of a built-in battery. The TV main body 3 is a broad concept including a variety of display devices such as a liquid crystal TV, an inorganic EL/organic EL display, or a plasma display, and is not limited by its display mechanism. Further, in the present specification, the TV main body 3 mainly includes a display output function, an audio output function, and the like, and on the other hand the wireless center 2 mainly includes a control function and the like for controlling a tuner section and the TV main body 3. In the TV main body 3 according to the present embodiment, the thin display device is explained using a liquid crystal TV as an example.

Between the wireless center 2 and the TV main body 3, data (image and/or audio data) is transmitted/received using an SS (spread spectrum) wireless method based on the IEEE 802.11 standard. Recently, the 5 GHz band is available as a frequency band, and so the 5 GHz band may be used instead of the 2.4 GHz band. Moving image data, DVD-Video data, and digital broadcasting data are transmitted from the wireless center 2 to the TV main body 3, using an MPEG (Moving Picture Expert Group)2 image compression format, via a communication line whose capacity is more than 10 Mbps. Further, transmission of a command (control command including transmission channel changing information) between the wireless center 2 and the TV main body 3 is performed using the SS wireless method.

When coded streams (bit rows) of an MPEG video and an MPEG audio, including other coded streams, are applied to a practical application, it is necessary to multiplex, synthesize, and combine the coded streams, including synchronization of the coded streams, and at the same time it is necessary to cause the streams to have a data form suitable for a format or protocol inherent in storage media or a network.

There are two kinds of MPEG2 system: one is a program stream (MPEG2-PS) which constitutes a program as with MPEG1, and the other is a transport stream (MPEG2-TS) which can constitute a plurality of programs.

An MPEG stream is a byte stream in which units such as flags (there are many 1 bit flags) and headers are ordered by 1 byte. All MPEG systems have a common data structure in which information indicative of length is disposed ahead of a data portion whose length is not fixed, and when the data portion is unnecessary, the data portion is skipped or a beginning of the next data group is located, and thereby reliable separated processing can be performed.

In order to prevent an over flow or under flow of image data and audio data on a decoding-side, it is necessary for a device which receives a compressed image and audio signal, based on an MPEG coding method, to coincide image and audio sampling frequencies on a coding-side with image and audio sampling frequencies or STC (System Time Clock) on the decoding-side.

For that reason, a decoding device synchronizes the image and audio sampling frequencies on the coding-side with the image and audio sampling frequencies on the decoding-side by using PCR (Program Clock Reference) or SCR (System Clock Reference) which are defined by the MPEG2 system standard (ISO/IEC standard 13818-1).

Figure 2:
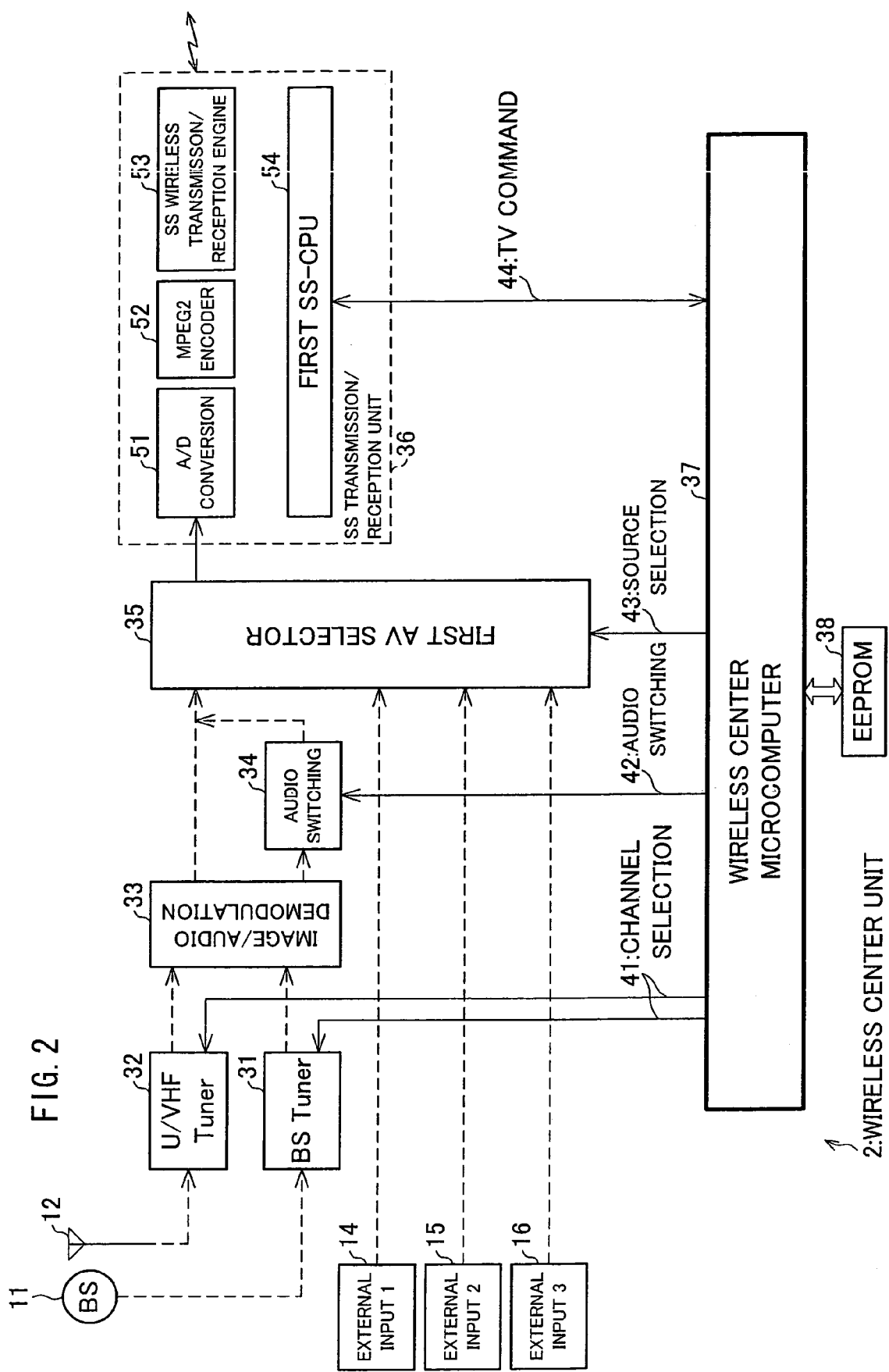
FIG. 2 is a block diagram illustrating a structure of a wireless center of the wireless AV system illustrated in FIG. 1.

FIG. 2 is a block diagram illustrating a structure of the wireless center 2 of the wireless AV system 1.

In FIG. 2, the wireless center 2 includes: a BS tuner 31, connected with the BS terminal 11, for receiving and selecting BS broadcasting according to a channel selection signal 41; a U/VHF tuner 32, connected with the U/VHF antenna terminal 12, for receiving and selecting U/VHF broadcasting according to a channel selection signal 41; an image/audio demodulating section 33 for demodulating an image/audio (AV) signal received and selected by the BS tuner 31 or the U/VHF tuner 32; an audio switching section 34 for switching, according to an audio switching signal 42, between a received audio and information concerning TV programs such as EPG (Electrical Program Guide); a first AV selector 35 for selecting, according to a source selection signal, (i) received image/audio information (ii) information concerning programs, and (iii) external input information from the video 1 input terminal (external input1) 14, the video 2 input terminal (decoder input) (external input 2) 15, and the video 3 input terminal (doubling as a monitor/BS output) (external input 3) 16; an SS transmission/reception unit 36 (communication means, communication state detection means, and communication state transmission means) for transmitting/receiving a TV command signal 44 and converting the data selected by the first selector 35 into the MPEG2 image compression format to be transmitted using the SS wireless method to the TV main body 3; a wireless center microcomputer 37 (controlling means) for transmitting the channel selection signal 41, the audio switching signal 42, source selection signal 43 and the like and transmitting/receiving the TV command signal 44 so as to control the whole of the device; an EEPROM (electrically erasable programmable ROM) 38 (storage means) which is an electrically rewritable non-volatile memory for storing a variety of data items such as a program for controlling the wireless center microcomputer 37, communication control data, and a transmission channel changing program.

The wireless center 2 includes a plurality of (in this case, two) broadcast receiving tuners. At least one tuner out of a plurality of BS tuner 31 and U/VHF tuner may be a tuner capable of receiving terrestrial digital broadcasting.

The SS transmission/reception unit 36 is constituted of: an A/D conversion section 51 for converting data selected by the first selector 35 into a digital signal; an MPEG2 encoder 52 for converting data into the MPEG2 image compression format; an SS wireless transmission/reception engine 53 comprising an SS wireless device and wireless control section for transmitting transmission data using the SS wireless method; and a first SS-CPU (Central Processing Unit) 54 for controlling each section of the SS transmission/reception unit 36, while detecting a state of a radio wave.

The SS wireless transmission/reception engine 53 includes a transmission function for transmitting an MPEG2 stream, a command and the like to an SS transmission/reception unit 61 (mentioned later in FIG. 3) of the TV main body 3, and a reception function for receiving commands and the like from the SS transmission/reception unit 61.

By changing a program written in the EEPROM 38, a variety of specifications in the wireless center 2 and the TV main body 3 can be changed. Namely, in order to avoid wasting time for changing a mask ROM with respect to each debug in system development, a non-volatile memory such as an EPROM or EEPROM is used as a program ROM, and thereby a time for developing or modifying a program is greatly reduced. Further, by downloading a program so as to rewrite program contents of the EEPROM, it becomes easy to upgrade or change the function.

Figure 3:
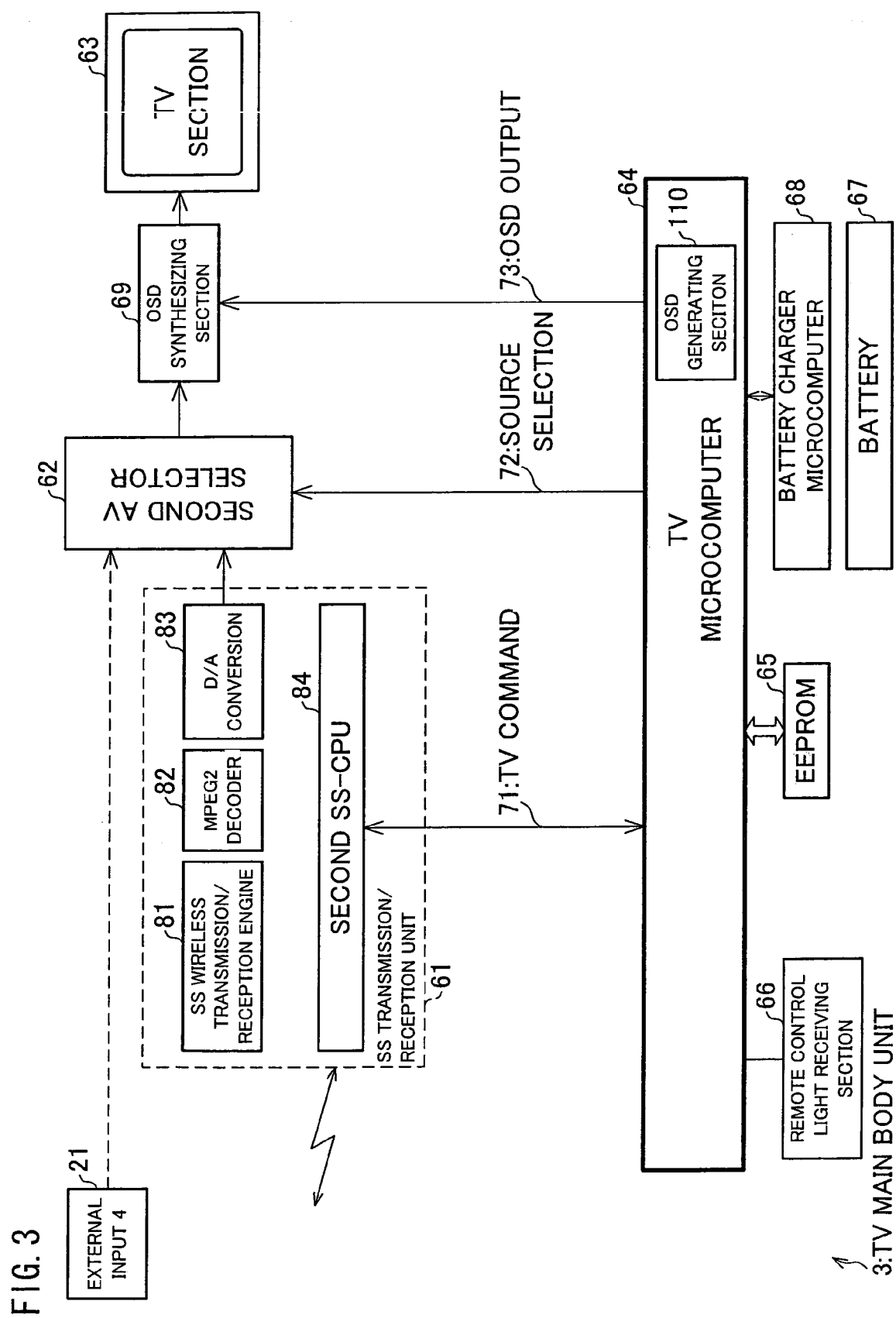
FIG. 3 is a block diagram illustrating a structure of a TV main body of the wireless AV system illustrated in FIG. 1.

FIG. 3 is a block diagram illustrating a structure of the TV main body 3 of the wireless AV system 1.

In FIG. 3, the TV main body 3 comprises: the SS transmission/reception unit 61 (communication means, communication state detection means, communication state acquisition means) for transmitting/receiving TV commands 71 and receiving an MPEG2 stream or command transmission data transmitted from the SS transmission/reception unit 36 of the wireless center 2, and decoding (restoring) the received MPEG2 stream and the like into the original data; a second selector 62 for selecting, according to a source selection signal 72, between data restored by the SS transmission/reception unit 61 and an AV signal inputted from outside via the video 4 input terminal (doubling as a TV output) (external input 4) 21; a TV section 63 (display means) comprising an LCD, speaker and the like for displaying an image signal and outputting an audio signal; an OSD synthesizing section 69 for performing, using an OSD output signal 73, image superposing processing in which OSD (On Screen Display) is superposed on an original image of a TV broadcast and the like; a TV microcomputer 64 (control means) for controlling the whole of the device, by transmitting/receiving the TV commands 71 and transmitting the source selection signal 72, the OSD output signal 73 and the like; an EEPROM 65 (storage means) which is an electrically rewritable non-volatile memory for storing a variety of data items such as a controlling program of the TV microcomputer 64, communication control data, and a transmission channel changing program; a remote control light receiving section 66 for receiving a control command in a light form from a remote control device (not shown); a battery 67; and a battery charger microcomputer 68 for controlling charging/discharging of the battery 67.

The SS transmission/reception unit 61 comprises: an SS wireless transmission/reception engine 81 comprising an SS wireless device and wireless control section for receiving data transmitted using the SS wireless method; an MPEG2 decoder 82 for decoding the received MPEG2 stream; a D/A conversion section 83 for converting decoded data into an analog signal; and a second SS-CPU 84 (communication state detection means) for controlling each section of the SS transmission/reception unit 61 and detecting a state of a radio wave.

The SS wireless transmission/reception engine 81 has: a receiving function for receiving an MPEG2 stream, a command and the like from the SS transmission/reception unit 36 of the wireless center 2; and a transmitting function for transmitting a command and the like from the SS transmission/reception unit 61.

Particularly, the second SS-CPU 84 has a function of radio wave state detection means for detecting a communication state (such as strength of a radio wave or hindrance to a communication route) between the wireless center 2 and the TV main body 3, according to electric field strength of a received radio wave, an error ratio, or a request for re-transmission based on an error ratio. Information indicating a state of the detected radio wave is transmitted to the TV microcomputer 64 as a TV command signal 71. Note that the detection of the communication state may be performed using any one of electric field strength of a received radio wave, an error ratio, and a request for re-transmission based on an error ratio, or using a combination of these. Further, the information may be transmitted as a command to the SS transmission/reception unit 36 of the wireless center 2.

In the present embodiment, an arrangement is described in which the second SS-CPU 84 in the TV main body 3 has the radio wave state detection function. However, it may be that the first SS-CPU 54 in the wireless center 2 has the same function, and that information indicating a state of a detected radio wave is transmitted as a command from the wireless center 2 to the TV main body 3. Alternatively, it may be that both the first SS-CPU 54 and the second SS-CPU 84 have the radio wave state detection function. Further, it may be that the TV microcomputer 64 or the wireless center microcomputer 37 has the radio wave state detection function.

The TV microcomputer 64 comprises a CPU, storage means and the like, and controls the whole of the device, including execution of AV device control processing. The storage means may include ROM, RAM, or an electrically rewritable non-volatile memory such as EEPROM or flash ROM, and stores a variety of data items such as a program, communication control data, and a discrimination code of a terminal.

Particularly, the TV microcomputer 64 performs graphic display of AV devices, connected to a network, on the display screen of the TV section 63, so that the AV devices are classified as at least a transmitter and a receiver, and changes the display of the AV devices according to a distance or a state of communication. That is, the TV microcomputer 64 performs graphic display of all the AV devices connected to the network so that the AV devices are displayed with perspective on a screen.

Further, the TV microcomputer 64 includes an OSD generating section 110 (display control means), and displays information such as a program channel, time, or volume, on a screen such as a TV. It is general that an image device such as a TV or an electronic apparatus such as a TV conference system display information such as a program channel, time, or volume on a TV screen. OSD data is maintained not in the form of an image but in a form referred to as a bit map. The OSD data in the bit map form is converted into pixel values in YUV form, which represents colors by Y, Cb, and Cr, and the converted pixels are superposed on an original image of a TV broadcast or the like. Further, when an image reproducing apparatus such as a DVD (not shown) is connected to the video 4 input terminal (external input 4) 21 which doubles as a TV output, it is possible to superpose OSD display on a reproduced image on a display screen. The process of superposing OSD display on an original image such as a TV broadcast is performed in the OSD synthesizing section 69.

The AV device connected to the network is displayed as OSD superposed on a reproduced image on a display screen of the TV section 63. Note that in the present embodiment, OSD display is used, but any display method is allowable as long as the display method is capable of graphic display as well as a video picture on the display screen. For example, the display method may be such that a graphic image is synthesized and displayed by carrying out an application.

Each of the AV devices on the network is displayed so that the AV devices are classified as a transmitter or a receiver. Further, a receiver is displayed so that it is classified as an image device or an audio device. Namely, all the AV devices on the network are displayed on the TV section 63.

Further, the TV main body 3 may be arranged so as to include a speaker, a key input section, a slot and the like (these are not shown). The slot is for inserting a card-type external extension storage medium, and directly reading data by inserting a card type external extension storage medium into the slot. Examples of the card type external extension storage medium are: an SRAM (Static RAM) card which maintains written information by power source back up; a compact flash (CF)™ made of a flash memory and the like which does not need power source back up; smart media™; a memory stick™; and a micro hard disc drive (HDD), whose size is substantially the same as a compact flash™, or which may be attached to a PC card Type II.

The remote control light receiving section 66 is a light communication port section using IR (Infrared), and receives a light signal from a remote control device for controlling a variety of operations in the TV main body 3 or the wireless center 2. To be specific, the remote control light receiving section 66 is an I/O port for performing light communication based on IrDA (Infrared Data Association), ASK (Amplitude Shift Keying) and the like, which are standards used for transmission of data by infrared, or via a wireless communication port by radio waves.

Further, the battery 67 supplies a predetermined power to each section of the TV main body 3. When it is possible to charge the battery 67, the battery charger microcomputer 68 detects that, for example, the TV main body 3 is attached to the wireless center 2 or other cradle, or that the TV main body 3 is connected to an AC power source 22 or a Car-DC power source 23, and controls charging/discharging of a charge medium (not shown) of the battery 67 via a power supply terminal (not shown). To be specific, the battery charger microcomputer 68 stores and counts a discharged current from a battery pack, and begins charging when it judges that a remaining amount of charge in the battery pack becomes less than a predetermined value. In charging, the battery charger microcomputer 68 stores and counts a charged current to the battery pack, and stops charging when it judges that the battery pack is fully charged. When the TV main body 3 is separated from a commercial power source, the charged battery 67 serves as a main power source for a portable TV, and supplies power to each section of the TV main body 3.

The function of the wireless AV system 1 with the above structure is explained below.

Figure 4:
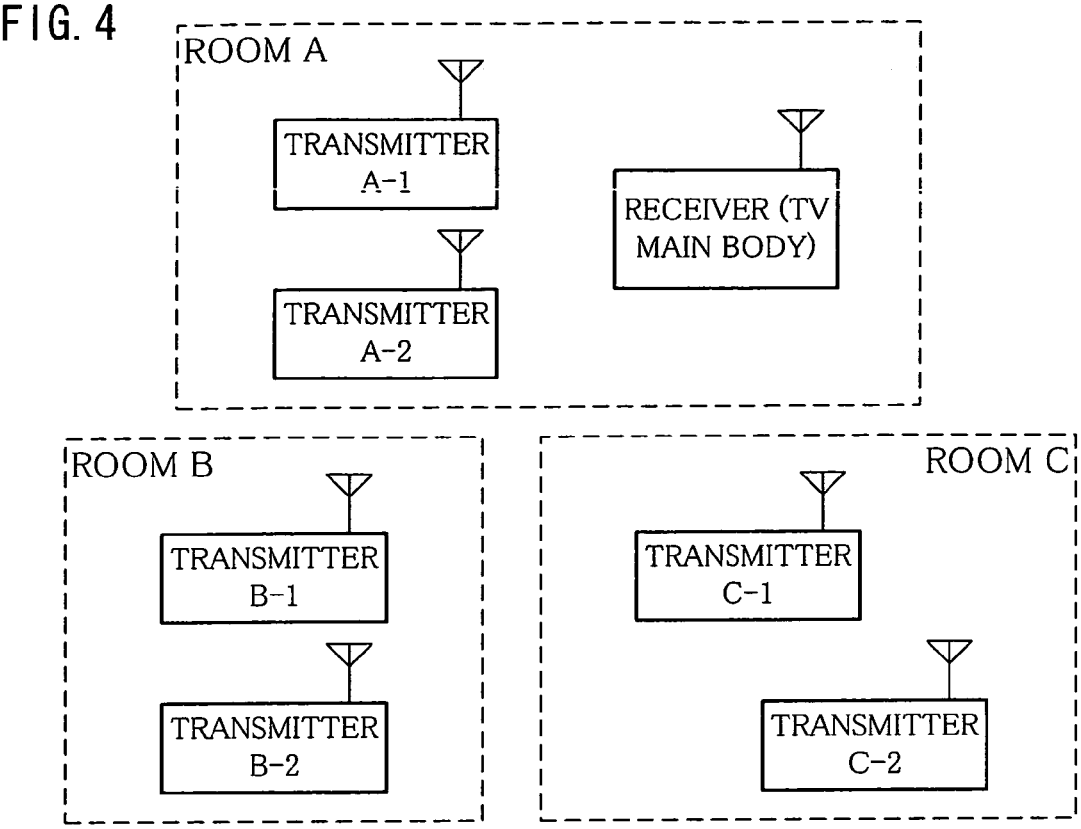
FIG. 4 is a block diagram illustrating a mode in which six wireless centers illustrated in FIG. 2 are used as transmitters and a TV main body illustrated in FIG. 3 is used as a receiver.

FIG. 4 illustrates a structure of a network comprising a plurality of transmitters/receivers. As illustrated in FIG. 4, transmitters A-1 and A-2, and a receiver thereof exist in a room A, transmitters B-1 and B-2 exist in a room B, and transmitters C-1 and C-2 exist in a room C. The transmitters A-1, A-2, B-1, B-2, C-1, and C-2 correspond to the wireless center 2 of the wireless AV system 1, and the receiver corresponds to the TV main body 3 of the wireless AV system 1.

As a technology for realizing a home AV network, for example, there is a standard specification referred to as HAVi (Home Audio/Video Interoperability) Architecture, whose standardization was completed in January 2000. As illustrated in the outline (1 General, 1.1 Scope) of the HAVi V1.0 Specification, the specification is used for providing an interface by which a user connects electric appliances with a computer, and controls a device via another device.

In the specification of HAVi, as an example, a construction of a network using IEEE 1394 and home electric appliances based on IEC (International Electrotechnical Commission) 61883 is assumed. Further, as described in the outline of the specification, all users can freely use devices connected to the network realized by HAVi. In this way, by connecting home AV devices and constructing the AV network according to HAVi, the user can use any combination of AV devices even when the devices exist in a far room.

As the wireless AV system 1, a wireless LAN, Bluetooth™, UWB (Ultra Wideband), or the like is used. A wireless LAN is widely used for portable information terminals such as portable notebook computers and PDAs (Personal Digital Assistants) having a wireless LAN function. As a portable phone which requires lower consumption of electricity, a low-electricity, close-range, two-way wireless communication method such as Bluetooth™ or UWB is noted. Bluetooth™ is a system for performing close-range, two-way wireless communication between a master (server) and a slave (client), and uses the 2.4 GHz frequency band which can be used all over the world, so as to allow communication between devices in any place in the world.

Figure 5:
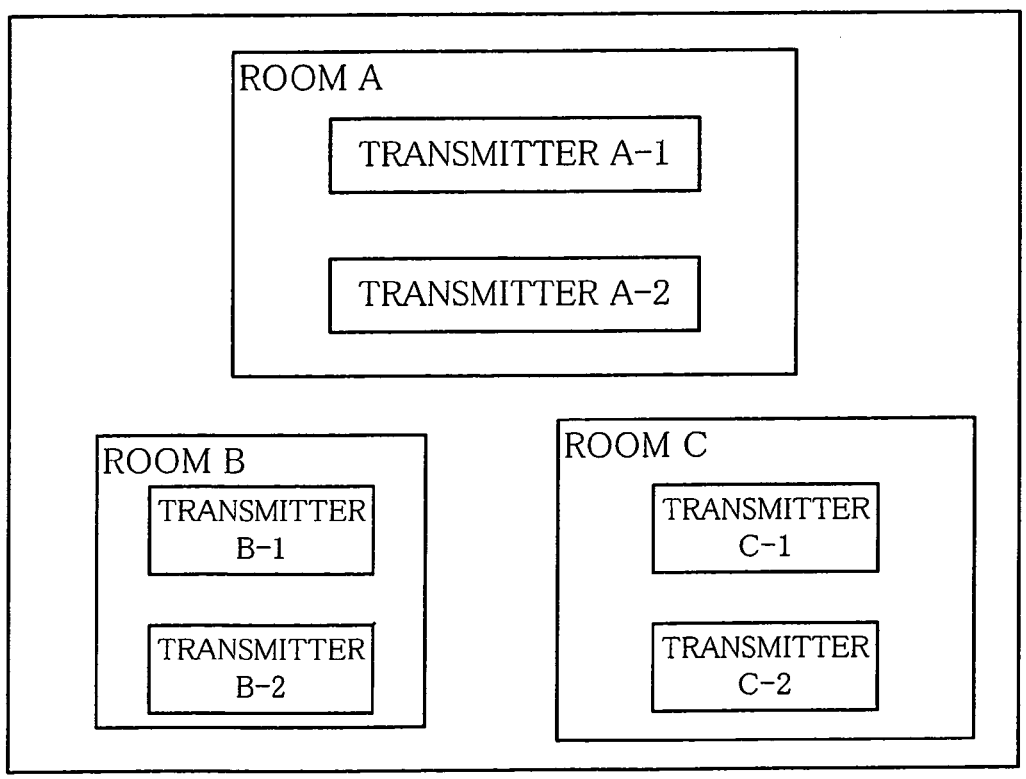
FIG. 5 is a figure illustrating an example in which the structure illustrated in FIG. 4 is displayed on a display screen of the receiver.

FIG. 5 illustrates a way of displaying the network structure in FIG. 4 on a display screen of a receiver (TV main body 3). As illustrated in FIG. 5, each of the AV devices on the network is displayed as a wireless communication device comprising a transmitter and a receiver with respect to each room. Namely, all the wireless communication devices on the network are displayed on the TV section 63. In FIG. 5, the transmitters A-1 and A-2 in the room A, the transmitters B-1 and B-2 in the room B, and the transmitters C-1 and C-2 in the room C are displayed by icons on the TV section 63. Further, detailed information such as a machine-type is also displayed.

In displaying the AV devices connected to the network, the device nearer to the room A in which the user and the receiver exist is displayed in a larger size on the screen. For example, when the room B is positioned farthest away from the room A, the transmitters B-1 and B-2 in the room B are displayed in the smallest size. FIG. 5 illustrates an example in which a display size of a device is changed according to a distance, but this is only an example, and it may be that nuances and colors of display are changed, or that, when a display device capable of 3-D display is used, a display effect of displaying with perspective is used. Alternatively, combinations of these may be used.

Figure 6:
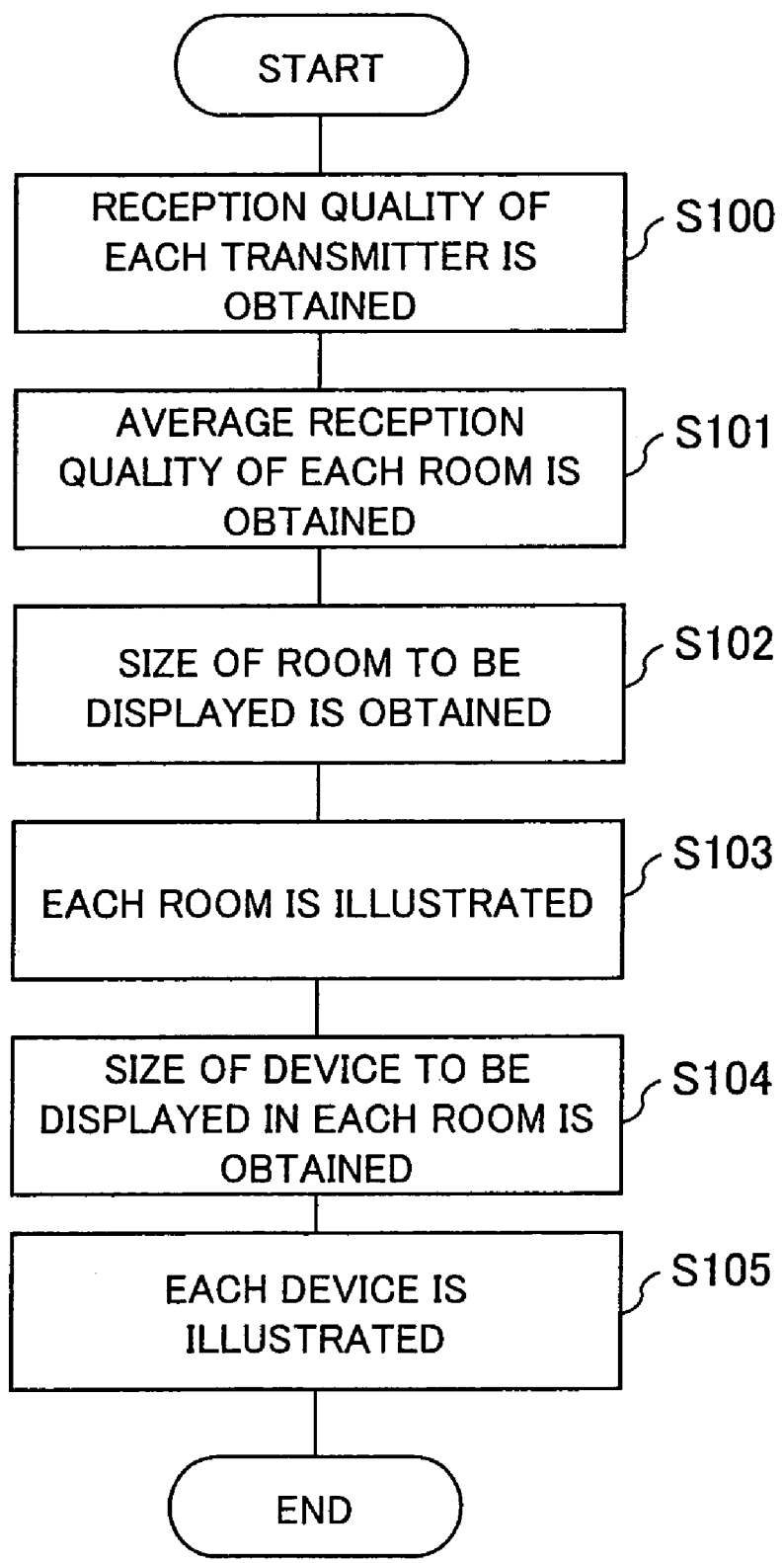
FIG. 6 is a flow chart illustrating a process by which the display example illustrated in FIG. 5 is displayed from a structure illustrated in FIG. 4.
Figure 7:
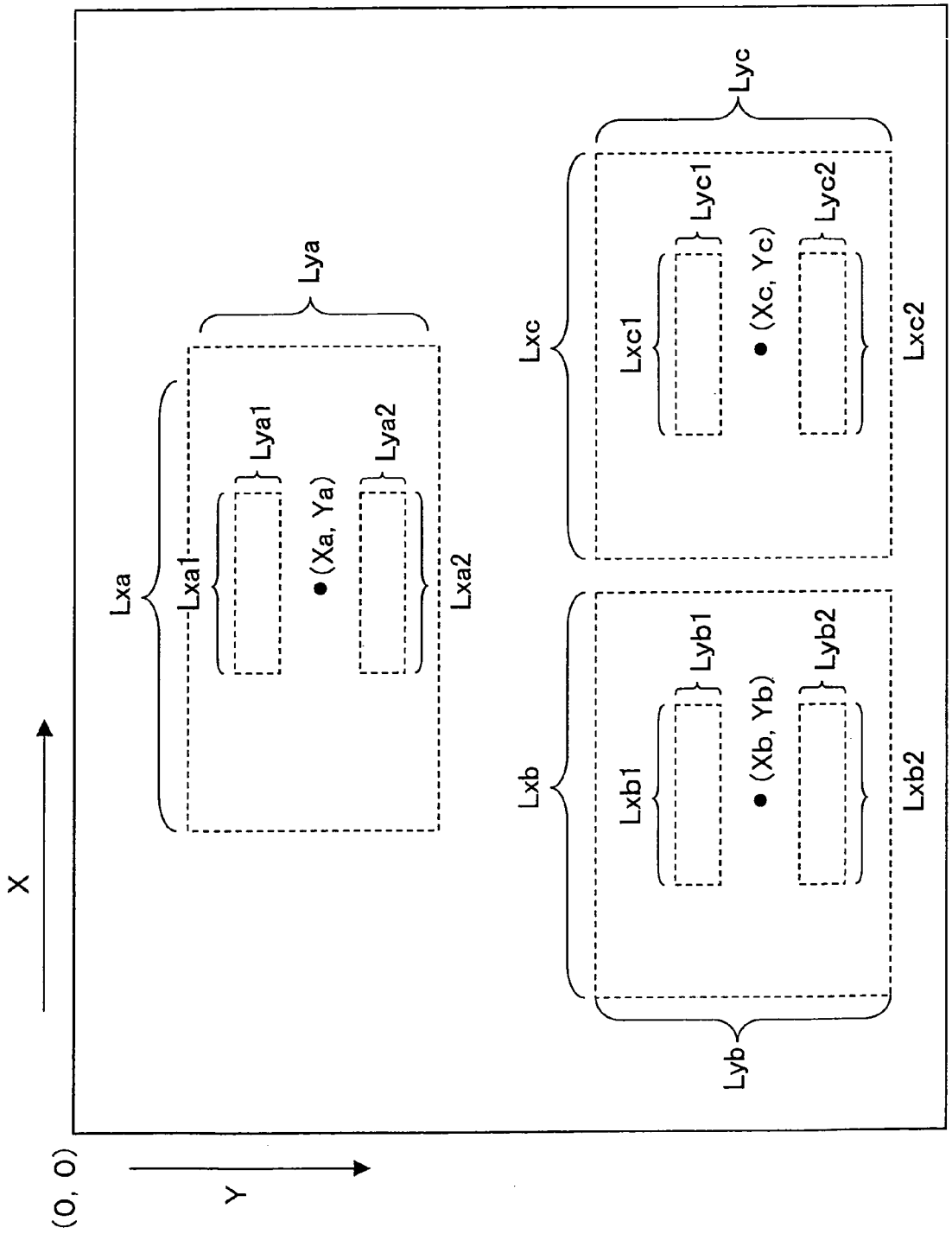
FIG. 7 is a block diagram illustrating detailed positions at which display frames for indicating each room, and images for indicating each transmitter are displayed.
Figure 9:
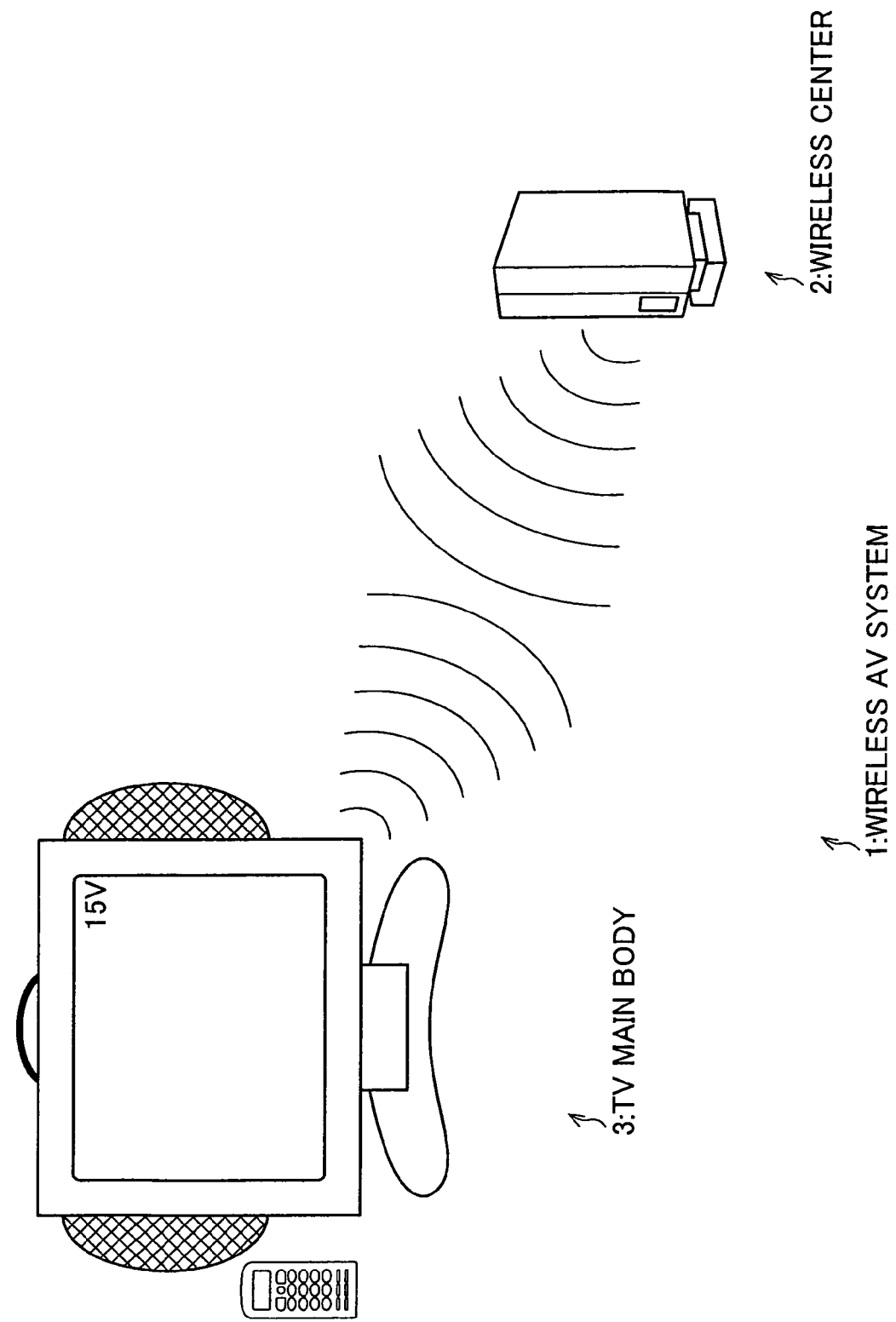
FIG. 9 is an explanatory figure illustrating the outline of the wireless AV system illustrated in FIG. 1.
Figure 10:
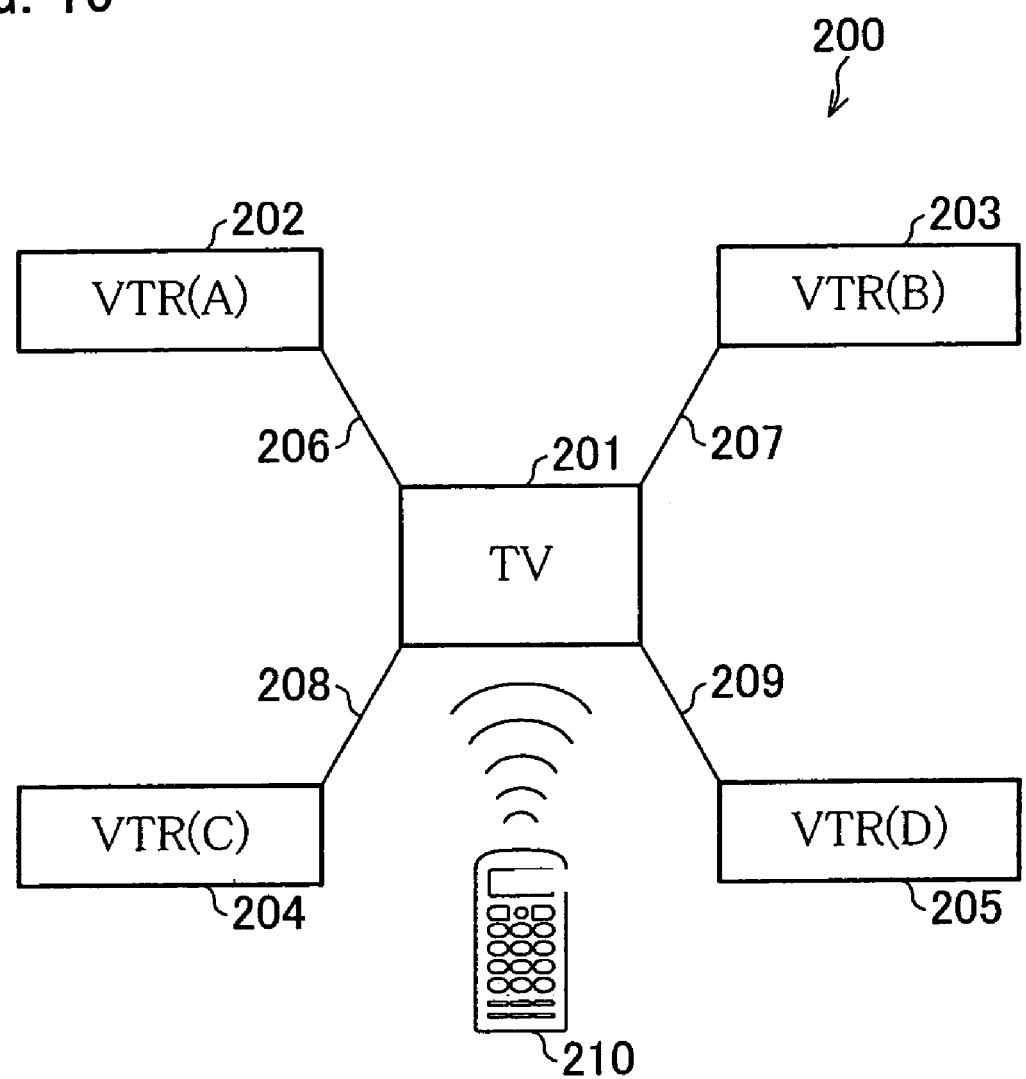
FIG. 10 is a block diagram illustrating an example of the conventional AV control system.

Next, a procedure of a process of displaying on the display screen, as illustrated in FIG. 5, the network structure illustrated in FIG. 4 is explained with reference to FIGS. 6 and 7. FIG. 6 is a flow chart illustrating the procedure of the process. FIG. 7 illustrates detailed positions at which display frames indicating each room and images indicating each transmitter are displayed on the display screen. In FIG. 7, a lateral direction on the display screen is an X direction, and a vertical direction is a Y direction. Further, the upper left corner of the display screen is coordinate (0, 0).

Here, it is registered beforehand which device (transmitter) is placed in which room. Namely, in the network structure, it is registered beforehand in the receiver (TV main body 3) that the transmitters A-1 and A-2 are placed in the room A, the transmitters B-1 and B-2 are placed in the room B, and the transmitters C-1 and C-2 are placed in the room C.

As illustrated in FIG. 6, first, reception quality Ra 1, Ra 2, Rb 1, Rb 2, Rc 1, and Rc 2 of the transmitters A-1, A-2, B-1, B-2, C-1, and C-2 are obtained (step S 100, referred to as "S 100" hereinafter. The same notation is applied to the other steps). Next, average reception quality of transmitters existing in the rooms A, B, and C, Ra=(Ra 1+Ra 2)/2, Rb=(Rb 1+Rb 2)/2, Rc=(Rc 1+Rc 2)/2, are obtained (S 101).

Next, the size of the display frames for indicating the rooms A, B, and C are obtained from the obtained average reception quality Ra, Rb, and Rc (S 102). That is, Lxa, Lxb, and Lxc which are the lengths in the X direction of the display frames of the rooms A, B, and C, and Lya, Lyb, and Lyc, which are the lengths in the Y direction are determined, so that a relation of Lxa:Lxb:Lxc=Lya:Lyb:Lyc=Ra:Rb:Rc is satisfied.

Next, display control is performed so as to display the display frames of the rooms A, B, and C on the display screen (S 103). That is, first, as illustrated in FIG. 7, central coordinates (Xa, Ya), (Xb, Yb), (Xc, Yc) of the display frames of the rooms A, B, and C are obtained so that the central coordinates are evenly placed on the display screen. Next, the display frames of the rooms A, B, and C are illustrated on the display screen, based on the obtained central coordinates of the display frames of the rooms A, B, and C and the sizes of display frames of the rooms A, B, and C obtained in the step S 102. For example, for the room A, the display frame is displayed so that coordinates of each corner are (Xa−Lxa/2, Ya−Lya/2), (Xa+Lxa/2, Ya−Lya/2), (Xa−Lxa/2, Ya+Lya/2), (Xa+Lxa/2, Ya+Lya/2).

Next, the size of the image for indicating the transmitter (device) existing in each room is obtained according to the reception quality of each transmitter (S 104). To be specific, Lxa 1 and Lxa 2 which are the lengths in the X direction of the images indicating the transmitters A-1 and A-2, and Lya 1 and Lya 2 which are the lengths in the Y direction are determined so that the relation of Lxa 1:Lxa 2=Lya 1:Lya 2=Ra 1:Ra 2 is satisfied. In the same manner, Lxb 1 and Lxb 2 which are the lengths in the X direction of the images indicating the transmitters B-1 and B-2, and Lyb 1 and Lyb 2 which are the lengths in the Y direction are determined so that the relation of Lxb 1:Lxb 2=Lyb 1:Lyb 2=Rb 1:Rb 2 is satisfied, and Lxc 1 and Lxc 2 which are the lengths in the X direction of the images indicating the transmitters C-1 and C-2, and Lyc 1 and Lyc 2 which are the lengths in the Y direction are determined so that the relation of Lxc 1:Lxc 2=Lyc 1:Lyc 2=Rc 1:Rc 2 is satisfied.

Then, display control is performed so as to illustrate images for indicating each transmitter in the display frame, indicating the room in which the transmitter exists (S 105). For example, as to the transmitter A-1, an image whose length in the X direction is Lxa 1 and whose length in the Y direction is Lya 1 is illustrated in the display frame of the room A.

As described above, the wireless AV system 1 according to the present embodiment comprises the wireless center 2 as a base device, and the TV main body 3 as a terminal device. The TV main body 3 includes: the SS reception unit 61 for receiving an MPEG2 stream and command transmission data transmitted from the SS transmission unit 36 of the wireless center 2 and for decoding the received MPEG2 stream or the like; the TV section 63 for performing display output based on an image signal and for performing audio output based on an audio signal; the TV microcomputer 64 for controlling the whole of the device; and the second SS-CPU 84 for detecting a communication state between the wireless center 2 and the TV main body 3, according to electric field strength of a received radio wave, an error ratio, or a request for re-transmission based on an error ratio. The TV microcomputer 64 performs OSD display of the AV devices connected to the network, so that the AV devices are displayed with perspective on the screen of the TV section 63.

As a result, an AV device near to the TV main body 3 viewed by the user is displayed with a large size, and an AV device in a far room is displayed with a small size. Therefore, a connection condition of the AV device or the like connected to the network is sensibly comprehendible. Further, the transmitters placed in each room are displayed with respect to each room. Therefore, even though there are a plurality of transmitters whose distances from the receiver are similar, it is easy to discriminate the locations of the transmitters because rooms in which the transmitters are placed are different.

Note that in the present embodiment, by performing OSD display on the TV section 63 of the AV device connected to the network, information on the connection condition is provided. However, the method of displaying the connection condition is not limited to OSD display, and may have any form.

Further, in the present embodiment, the distance is judged according to the communication state, but GPS (Global Positioning System) may be used for detecting the position, and the same effect can be obtained. However, the method using the radio wave strength, the error ratio, or the request for re-transmission based on the error ratio, as described in the present embodiment, is superior in that, because the method can use existing parts and can be realized only by a change of software, the method can be used with ease and at a low cost.

Further, in the present embodiment, the SS transmission/reception unit 61 of the TV main body 3 detects the communication state. However, it may be that the SS transmission/reception unit 36 of the wireless center 2 detects the communication state, and wirelessly transmits the result of detection to the SS transmission/reception unit 61 of the TV main body 3. In this case, it is unnecessary for the TV main body 3 to detect the communication state, and therefore it is possible to downsize the TV main body 3, and to reduce consumption of electricity of the TV main body 3.

Further, it may be that the transmitter (wireless center 2) detects a state of communication with other transmitters (wireless center 2), and transmits the result of detection to the receiver (TV main body 3). FIG. 8 illustrates in a tabular form a detection result in which not only the receiver but also the transmitters A-2 and C-1 detect the state of communication with the receiver and other transmitters. The receiver acquires the detection result illustrated in FIG. 8, and thereby it is possible to display, on a display screen of the receiver, a positional relationship in two-dimensions between the receiver and the transmitter. As a result, it is possible to comprehend the position of the transmitter more easily.

Further, the TV main body 3 may be arranged so as to acquire the state of communication with a wireless center 2 with which a communication link is established, out of wireless centers 2 that can be communicated with. In this case, because the user can comprehend the state of communication with a wireless center 2 with which the user wants to communicate, the user can move the TV main body 3 so as to improve the state of communication.

The device control system in the wireless AV system of the present invention is explained above, with reference to concrete embodiments. However, the present invention is not limited to the embodiments. It is possible for a person with ordinary skill in the art to which the invention pertains, to perform a variety of changes or modifications to arrangements and functions of the invention according to each of the embodiments or other embodiments, within the scope of the present invention.

Further, in the present embodiment, a portable TV is used as a wireless AV device. However, the present invention is not limited to a TV receiver, and is applicable to a device having a wireless communication function or to a device into which a wireless communication function is merged. For example, the AV device may be a VTR (Video Tape Recorder), or record reproducing device which stores a record in a HDD or DVD. Further, a device for transmission/reception of data may be a device in which a function of transmission/reception of data is merged with an information device function represented by a personal computer, and applicable to all the systems. Further, contents of transmitted/received data may be anything.

Further, in the present embodiment, the TV receiver is exemplified, but the present invention is not limited to this, and is applicable to a personal computer with a tuner, or to other AV devices using a tuner.

Further, kinds of each section constituting the wireless communication device and the wireless AV system, and kinds/styles of setting information or the like are not limited to the embodiments. Particularly, the present invention may be preferably applied to a device based on HAVi.

Further, as a tuner, two broadcasting tuners such as a BS tuner and a U/V tuner are exemplified, but kinds and numbers of broadcasting tuners are not limited to this. For example, a CS tuner may be used.

Further, in the present embodiment, names such as a wireless communication device and a wireless AV system are used, but these names are used for convenience of explanation, and they may be a wireless communication apparatus, an AV device, a device control system, or the like.

The wireless AV system as described above can be realized by a program for causing the wireless AV system to function, the program being stored in a storage medium readable by a computer. In the present invention, the storage medium may be program media being a main memory itself, or program media readable by inserting a storage medium into a program reading device provided as an external storage device.

In either case, the stored program may be arranged so as to be carried out by access of a CPU. Alternatively, in either case, the program may be arranged so as to be read out, downloaded to a program storage area (not shown) and carried out. A program for downloading is stored in the main body of the device beforehand.

Here, the program media may be arranged so as to be a storage medium detachable from the main body, and may be a medium permanently storing a program. For example, a tape such as a magnetic tape or a cassette tape, a disc such as a magnetic disc (e.g. floppy™ disc or a hard disc) or an optical disc (e.g. CD-ROM, MO, MD, or DVD), a card such as an IC card or an optical card, or a semiconductor memory such as a mask ROM, EPROM, EEPROM, or flash ROM.

Further, when means (not shown) for connecting with an external communication network is provided, the program medium may be arranged so as to be a medium for temporarily storing a program so as to download the program from the communication network via the means for connecting with the external communication network.

Note that when a program is downloaded from the communication network in this way, a program for downloading may be stored in the main body of the device beforehand, or may be installed from other storage media. Contents to be stored in the storage media are not limited to programs, and may be data.

The present invention is not limited to the present embodiments, and a variety of modifications are possible within the scope of the present invention. For example, the following arrangements are possible.

For example, the wireless AV system of the present invention is a wireless AV system including one or more display devices and apparatuses connected to a network, wherein the display device(s) include communication state detection means for detecting a state of communication between the display device(s) and the apparatus(es), and control means for displaying the apparatus(es) connected to the network, on a screen of display means, according to the state of communication.

The communication state detection means may be arranged so as to detect a state of communication, based on electric field strength of a received radio wave, an error ratio, or frequency of a request for re-transmission based on an error ratio.

The communication state detection means may be arranged so as to detect a state of communication between the display device(s) and the apparatus(es) between which a communication link is established.

It is preferable that the control means displays the apparatus connected to the network, so as to give perspective.

The control means displays the apparatus(es) connected to the network in a form according to a state of communication.

To be specific, the apparatus is a TV receiver comprising a display device and a center device which includes a tuner for reception of broadcasts and which transmits image and audio data to the display device.

Further, the present invention is the wireless AV system, including one or more display devices and apparatuses connected to the network, and is a program for detecting the state of communication between the display device and the apparatus, and for causing a computer to carry out a process for displaying the apparatus(es) connected to the network on the screen of the display means according to the state of communication.

Further, the present invention is the wireless AV system including one or more display devices and apparatuses connected to the network, and is a storage medium readable by a computer, which stores a program for detecting the state of communication between the display device(s) and the apparatus(es), and for causing a computer to carry out a process for displaying the apparatus connected to the network on the screen of the display means according to the state of communication.

With the invention, because the user can easily understand the AV apparatus or the like connected to the network, the usability increases.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The wireless system of the present invention is preferably used for a home AV network system (e.g. a wireless TV receiver having a separable display) that wirelessly transmits image and/or audio data. However, the wireless system of the present invention is not limited to this, and is widely applicable for wireless communication devices such as mobile phones/PHS (Personal Handy-Phone System)™ or portable information terminals (PDA).

The invention claimed is:

1. A control method of a display device including: reception means for receiving data transmitted wirelessly from a plurality of transmission devices contained in at least one room; and display means for displaying information,
wherein said display device detects a degree of reception of the reception means, and displays an image of a frame of the at least one room, in which for each room the respective frame encloses one or more transmission devices that are contained in the room, in which a size of each image becomes larger as the degree of reception detected of signals received from the transmission devices in the respective room becomes greater.

2. A control method of a display device including: communication means for performing wireless communication of data with each of a plurality of communication devices; and display means for displaying information,
wherein said display device detects a degree of communication of the communication means, and displays images of frames of at least one room, in which a size of each image becomes larger as the degree of communication detected regarding the communication devices in the respective room becomes greater.

3. A control method of a wireless communication system made by connecting one or more communication devices with a display device so that the one or more communication devices can wirelessly communicate with the display device,
wherein:
the one or more communication devices include communication means for performing wireless communication of data with the display device,
the display device includes communication means for performing wireless communication of data with the one or more communication devices, and display means for displaying information,
said wireless communication system detects a degree of communication of communication means of the one or more communication devices, transmits the detected degree of communication from the one or more communication devices to the display device, and displays an image or images of a frame of the at least one room on display means of the display device so that a size of each image becomes larger as the degree of communication detected regarding the communication devices in the respective room becomes greater.

4. A display device, comprising:
reception means for receiving data transmitted wirelessly from a plurality of transmission devices contained in at least one room;
display means for displaying information; and
control means for controlling a function of the display device,
wherein the control means includes:
reception degree detection means for detecting a degree of reception of the reception means; and
display control means for controlling the display means so that the display means displays an image of a frame of the at least one room, in which for each room the respective frame encloses one or more transmission devices that are contained in the room, in which a size of each image becomes larger as the degree of reception detected by the reception degree detection means of signals received from the transmission devices in the respective room becomes greater.

5. The display device as set forth in claim 4, wherein the reception degree detection means detects the degree of reception, based on at least one of electric field strength of a received radio wave and an error ratio of received data.

6. A display device, comprising:
communication means for performing wireless communication of data with each of a plurality of communication devices contained in at least one room;
display means for displaying information; and
control means for controlling a function of the display device,
wherein the control means includes:
communication degree detection means for detecting a degree of communication of the communication means; and
display control means for controlling the display means so that the display means displays an image of a frame of the at least one room, in which for each room the respective frame encloses one or more communication devices that are contained in the room, in which a size of each image becomes larger as the degree of communication detected by the communication degree detection means of signals received from the communication devices in the respective room becomes greater.

7. The display device as set forth in claim 6, wherein the communication degree detection means detects the degree of communication, based on at least one of electric field strength of a received radio wave, an error ratio of received data, and frequency of a request for re-transmission of data based on the error ratio.

8. The display device as set forth in claim 6, wherein the display control means determines a distance from the display device, based on the degree of communication detected by the communication degree detection means, and controls the display means so that the display means displays the image of the frame of the respective room, based on the determined distance.

9. The display device as set forth in claim 8, wherein the display control means controls the display means so that the display means displays according to perspective.

10. The display device as set forth in claim 6, wherein the communication degree detection means detects a degree of communication with communication device(s) with which a communication link is established, out of the plurality of communication devices.

11. A wireless communication system made by connecting one or more communication devices with a display device so that the one or more communication devices can wirelessly communicate with the display device,
wherein:
the one or more communication devices are contained in at least one room and include communication means for performing wireless communication of data with the display device, and
control means for controlling a function of the one or more communication devices;

the display device includes
communication means for performing wireless communication of data with the one or more communication devices,
display means for displaying and outputting information, and
control means for controlling a function of the display device;
the control means of the one or more communication devices includes
communication degree detection means for detecting a degree of communication of the communication means, and
communication degree transmission means for transmitting, via the communication means, to the display device, the degree of communication detected by the communication degree detection means; and
the control means of the display device includes
communication degree acquisition means for acquiring, via the communication means, the degree of communication detected by the communication degree detection means of the one or more communication devices, and
display control means for controlling the display means so that the display means displays an image or images of a frame of the at least one room, in which for each room the respective frame encloses one or more communication devices that are contained in the room, in which a size of each image becomes larger as the degree of communication acquired by the communication degree acquisition means of signals received from the communication devices in the respective room becomes greater.

12. The wireless communication system as set forth in claim 11, wherein the communication degree detection means of the one or more communication devices detect the degree of communication, based on at least one of electric field strength of a received radio wave, an error ratio of received data, and frequency of a request for re-transmission of data based on the error ratio.

13. The wireless communication system as set forth in claim 11, wherein the display control means of the display device determines a distance from the display device, based on the degree of communication acquired by the communication degree acquisition means, and controls the display means so that the display means displays the image or images of the frame of the respective room, based on the determined distance.

14. The wireless communication system as set forth in claim 13, wherein the display control means of the display device controls the display means so that the display means displays according to perspective.

15. The wireless communication system as set forth in claim 11, wherein the communication degree acquisition means of the display device acquires a degree of communication with communication device(s) with which a communication link is established, out of the one or more communication devices.

16. The wireless communication system as set forth in claim 11, wherein
there are a plurality of the communication devices,
the communication means of each of the communication devices performs wireless communication of data with other communication device(s) as well as with the display device,
the communication degree detection means of each of the communication devices detects a degree of communication with other communication device(s) as well as with the display device,
the display control means of the display device controls the display means so that the display means displays the image of the frame of the room, based on the degree of communication of the communication devices acquired by the communication degree acquisition means.

17. The wireless communication system as set forth in claim 11, wherein
there are a plurality of the communication devices,
the communication means of each of the communication devices performs wireless communication of data with other communication device(s) as well as with the display device,
the communication degree detection means of each of the communication devices detects a degree of communication with other communication device(s),
the display device further includes communication degree detection means for detecting a degree of communication with each of the communication devices, and
the display control means controls the display means so that the display means displays the image of the frame of the room, based on (i) the degree of communication of each of the communication devices acquired by the communication degree acquisition means and (ii) the degree of communication with each of the communication devices detected by the communication degree detection means.

18. A computer readable non-transitory storage medium encoded with a display device control program for causing the display device as set forth in claim 4 to function, and for causing a computer to function as the control means.

19. A computer readable non-transitory storage medium encoded with a wireless communication system control program for causing a wireless communication system as set forth in claim 11 to function, and for causing a computer to function as control means for both of the communication device and the display device.

20. A computer readable non-transitory storage medium encoded with a display device control program for causing the display device as set forth in claim 6 to function and for causing a computer to function as the control means.

21. The display device as set forth in claim 4, wherein the display control means for controlling the display means displays an image of the frame of each room, in which a size of each image is according to average of the degree of reception for the transmission devices contained in the respective room.

22. The display device as set forth in claim 4, wherein the degree of reception corresponds to distance of the transmission device to the reception means.

23. The display device as set forth in claim 6, wherein the display control means for controlling the display means displays an image of the frame of the at least one room, in which a size of each image is according to average of the degree of communication for the communication devices contained in the respective room.

24. The display device as set forth in claim 11, wherein the display control means for controlling the display means displays an image of the frame of the at least one room, in which a size of each image is according to average of the degree of communication for the communication devices contained in the respective room.

* * * * *